United States Patent
Bichler et al.

(10) Patent No.: US 8,897,446 B2
(45) Date of Patent: *Nov. 25, 2014

(54) METHODS FOR THE GENERATION OF IDENTICAL SYMMETRICAL CRYPTOGRAPHIC KEYS

(75) Inventors: Daniel Bichler, Munich (DE); Guido Stromberg, Munich (DE); Manuel Loew, Munich (DE); Daniel Barisic, Dortmund (DE); Martin Krogmann, Munich (DE); Thomas Lentsch, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,339

(22) Filed: Sep. 11, 2012

(65) Prior Publication Data
US 2013/0010956 A1 Jan. 10, 2013

Related U.S. Application Data

(63) Continuation of application No. 12/031,004, filed on Feb. 14, 2008, now Pat. No. 8,363,838, which is a continuation of application No. 11/840,240, filed on Aug. 17, 2007, now Pat. No. 8,275,123.

(51) Int. Cl.
H04L 9/00 (2006.01)
H04L 9/08 (2006.01)

(52) U.S. Cl.
CPC ......... H04L 9/0872 (2013.01); *H04L 2209/805* (2013.01)
USPC ................ 380/259; 380/28; 380/44; 380/270

(58) Field of Classification Search
USPC ...................... 380/28, 44, 259, 270
See application file for complete search history.

(56) References Cited

U.S. PATENT DOCUMENTS 5,696,828 A 12/1997 Koopman
6,430,170 B1 8/2002 Saints
(Continued)

FOREIGN PATENT DOCUMENTS

DE 10 2006 004 399 8/2007
EP 1722299 11/2006
(Continued)

OTHER PUBLICATIONS

OpenUAT: The Open Source Ubiquitous Authentication Toolkit at.www.openuat.org/home, as available on Feb. 14, 2008, 2 pages.
Mayrhofer et al., *OpenUAT: The Open Source Ubiquitous Authentication Toolkit*, pp. 1-19, Aug. 2010.
Application and File History of U.S. Appl. No. 11/840,240, Inventors Bichler et al., filed Aug. 17, 2007.
(Continued)

*Primary Examiner* — Amare F Tabor
(74) *Attorney, Agent, or Firm* — Patterson Thuente Pedersen, P.A.

(57) ABSTRACT

Methods and algorithms for generating identical symmetrical cryptographic keys. In a method for generating a symmetrical cryptographic key, a first profile is generated, the first profile comprising a series of data points collected over a first period of time. A start time of the first profile is identified and the first profile divided into a sequence of time-based segments, each time-based segment comprising at least one data point. A first symmetrical cryptographic key is calculated from the sequence of time-based segments, and the first symmetrical cryptographic key is stored for at least one of encrypting and decrypting data in cooperation with a second symmetrical cryptographic key substantially identical to the first symmetrical cryptographic key.

9 Claims, 5 Drawing Sheets

(56) References Cited

U.S. PATENT DOCUMENTS

| | | | |
|---|---|---|---|
| 6,993,542 | B1 | 1/2006 | Meiyappan |
| 7,111,322 | B2 | 9/2006 | Slick |
| 7,286,987 | B2 | 10/2007 | Roy |
| 7,427,926 | B2 * | 9/2008 | Sinclair et al. ............ 340/4.2 |
| 7,643,633 | B2 | 1/2010 | Orr |
| 7,885,417 | B2 | 2/2011 | Christoph |
| 8,433,537 | B2 * | 4/2013 | Beute ............ 702/141 |
| 2003/0021411 | A1 | 1/2003 | Seroussi |
| 2003/0112978 | A1 | 6/2003 | Rodman |
| 2003/0140232 | A1 * | 7/2003 | De Lanauze ............ 713/186 |
| 2005/0172154 | A1 | 8/2005 | Short |
| 2006/0251249 | A1 | 11/2006 | Orr |
| 2007/0188323 | A1 | 8/2007 | Sinclair |
| 2008/0019514 | A1 * | 1/2008 | Stromberg et al. ............ 380/46 |

FOREIGN PATENT DOCUMENTS

| | | |
|---|---|---|
| WO | WO 01 95091 | 12/2001 |
| WO | WO 02 31778 | 4/2002 |
| WO | WO 2005 043805 | 5/2005 |

OTHER PUBLICATIONS

Application and File History of U.S. Appl. No. 12/031,004, Inventors Bichler et al., filed Feb. 14, 2008.

Diffie et al., "Privacy and Authentication: An Introduction to Cryptography," Proceedings of the IEEE, vol. 67, No. 3, Mar. 1979 (32 pages).

Mayrhofer et al., "Shake Well Before Use: Uthentication Based on Accelerometer Data," Pervasive 2007, LNCS 4480, pp. 144-161, Springer-Verlag Berlin Heidelberg 2007 (18 pages).

Rivest et al., "A Method for Obtaining Digital Signatures and Public-Key Cryptosystems, " Association of Computing Machinery, pp. 1-15, 1977 (15 pages).

Rene Mayrhofer, "Towards an Open Source Toolkit for Ubiquitour Device Authentication," Workshops Proc. PerComo 2007: $5^{th}$ IEEE International Conference on Pervasive Computing and Communications, pp. 247-252, IEEE CS Press, Mar. 2007 (6 pages).

Bichler et al., "Security and Privacy for Pervasive Computer," Energiebewusste Systeme und Methoden und Systemsoftware fuer Pervasive Computing, pp. 48-55, University of Erlangen-Nuremberg, Oct. 2005.

* cited by examiner

METHODS FOR THE GENERATION OF IDENTICAL SYMMETRICAL CRYPTOGRAPHIC KEYS

RELATED APPLICATION

This application is a continuation of application Ser. No. 12/031,004 filed Feb. 14, 2008, which in turn is a continuation of application Ser. No. 11/840,240 filed Aug. 17, 2007, both of which are hereby fully incorporated herein by reference, in their entireties.

FIELD OF THE INVENTION

The invention relates generally to cryptography. More particularly, the invention relates to methods of generating identical symmetrical cryptographic keys for communications between devices.

BACKGROUND OF THE INVENTION

To improve safety and security, communications between devices can be cryptographically encoded. Cryptographic encoding can serve multiple purposes. For example, encryption can protect the message from eavesdropping and maintain the integrity of the content of the message. Encryption can also assist in verification of the identity of a party involved in the transmission or receipt of a message.

The safety and security of communications themselves can additionally be improved by safe and secure use and control of the devices used to transmit and receive the communications. This can be of particular importance when communications are exchanged wirelessly between devices. One device-level procedure is symmetrical coding, in which a transferable common key is used for both coding and decoding of messages. In symmetrical coding, however, all communication participants need the same key in order to encode and decode, requiring transfer of the symmetrical key to other devices. There exist safe but calculation-intense methods for these transfers, such as Diffie-Hellman. These methods are therefore not practical if the devices are not able to carry out the necessary calculations because of insufficient arithmetic capability or energy consumption limitations. These concerns can be relevant, for example, to small, portable electronic devices.

Other procedures used in which a first public key is available, such as on a network, and a second private or secret key is stored locally on a participating device. No exchange of keys is required in such a configuration. The coding and decoding of communications according to such procedures, however, is calculation-intense and again impractical or impossible to use in devices with limited calculation capability or energy consumption concerns. Further, communications can only be exchanged between two devices having the necessary and corresponding keys. Only with additional configurations can coded communications among several devices be exchanged.

Another procedure for the exchange of symmetrical keys involves generating identical cryptographic keys by disparate but similarly situated devices from a common physical characteristic, and different keys from differently situated devices. An assumption in such a procedure is that the devices that will exchange encoded communications are exposed to the same physical characteristic, thereby enabling each to independently and accurately generate an identical key to be used in the encoding and decoding of messages. The identification of the common physical characteristic and the subsequent generation of the identical symmetrical keys are carried out external to the device transmission unit, with the measurement or other determination of the physical characteristic carried out by one or more external sensors or transducers and the subsequent cryptographic key generation by a microcontroller. The microcontroller can then encode the message or information to be transmitted using the generated key and pass the encoded information to the transmission unit. With this procedure external components, with respect to the transmission unit, are used to measure the physical characteristic, adding to the cost, size, and general complexity of the device.

SUMMARY OF THE INVENTION

Embodiments of the invention are directed to methods and algorithms for generating identical symmetrical cryptographic keys. In a method for generating a symmetrical cryptographic key, a first profile is generated, the first profile comprising a series of data points collected over a first period of time. A start time of the first profile is identified and the first profile divided into a sequence of time-based segments, each time-based segment comprising at least one data point. A first symmetrical cryptographic key is calculated from the sequence of time-based segments, and the first symmetrical cryptographic key is stored for at least one of encrypting and decrypting data in cooperation with a second symmetrical cryptographic key substantially identical to the first symmetrical cryptographic key.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which.

Figure 1:
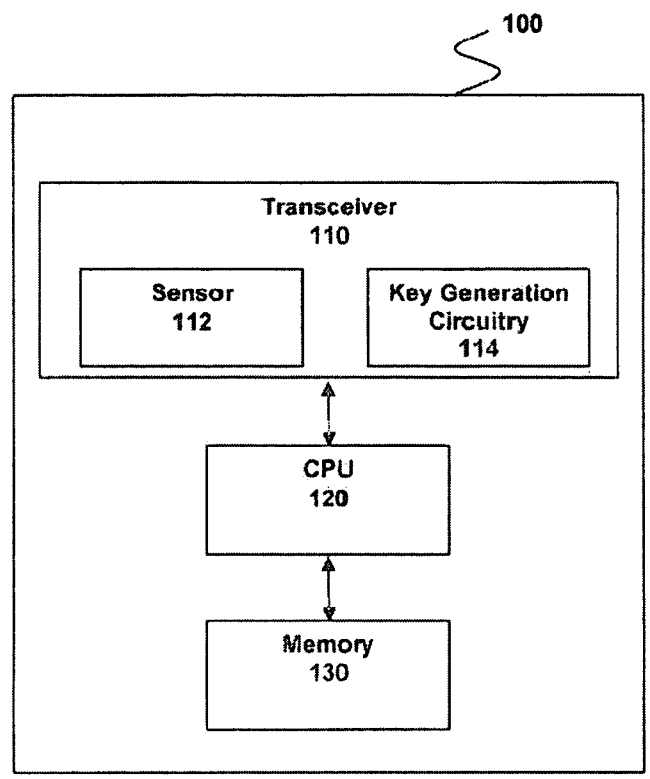
FIG. 1 is a block diagram of a device according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

An integrated transceiver and sensor are described. In one embodiment, the sensor comprises an acceleration sensor. The integrated transceiver and sensor can be incorporated in a device capable of transmitting and receiving communications. The sensor is capable of generating an acceleration profile from a physical, environmental, or other suitable input or event, and the acceleration profile can be used by the transceiver to generate a cryptographic key.

In one embodiment, each of a plurality of devices capable of exchanging communications comprises an integrated transceiver and sensor. The devices, and thereby the integrated transceiver and sensor, can be subjected to a common physical, environmental, or other condition from which the sensor is capable of locally creating a data profile. The data profile can then be used to generate a key within the transceiver in each device. Because of the common condition from which each local data profile is created, the keys generated in each transceiver will be identical to one another, for use in symmetrical data encoding and communications exchange between the devices.

The invention can be more readily understood by reference to FIGS. 1-7 and the following description. While the invention is not necessarily limited to the specifically depicted application(s), the invention will be better appreciated using a discussion of exemplary embodiments in specific contexts.

Referring to FIG. 1, one embodiment of a device 100 is depicted. Device 100 can transmit and/or receive communications and can comprise, for example, a mobile phone, a personal digital assistant (PDA), a remote wireless transmitter, a media device such as a music or game player, or another suitable device. As depicted, device 100 comprises a transceiver 110, a central processing unit (CPU) 120, and memory 130, although device 100 can comprise additional or fewer modules in other embodiments. For example, mobile phones and other devices typically comprise user interface features, which are not depicted in FIG. 1.

Transceiver 110 comprises transmission and reception circuitry and components (not shown) capable of facilitating communications. In other embodiments, transceiver 110 can comprise either a transmitter or a receiver, and corresponding circuitry and components, respectively, depending on device capabilities and functionality. The communications can be wired in one embodiment, or wireless, such as radio frequency (RF), infrared, and/or ultrasonic, in other embodiments.

Transceiver 110 further comprises an integrated sensor 112. In one embodiment, sensor 112 comprises an acceleration sensor. In other embodiments, integrated sensor 112 comprises a microphone or other acoustic sensor, an infrared sensor, an ultrasonic sensor, a thermal sensor, or another suitable sensor or transducer.

In use, integrated sensor 112 is configured to generate or otherwise transduce an electrical signal from a physical or environmental factor. For example, in an embodiment in which integrated sensor 112 comprises an acceleration sensor, applying a physical stimulus to device 100 such as shaking, vibration, or other movement can cause integrated sensor 112 to generate an electrical signal related at least in part to the physical stimulus. In an embodiment in which integrated sensor 112 comprises an acoustic sensor, sound or noise can cause integrated sensor 112 to generate an electrical signal related at least in part thereto. Similarly, other types of sensors can generate electrical signals related at least in part to other types of input, stimulus, and/or conditions.

Transceiver 110 further comprises cryptographic key generation circuitry 114. Circuitry 114 is configured to create a cryptographic key from the electrical signal generated by integrated sensor 112. The cryptographic key can be used to encode data to be transmitted by transceiver 110 and device 100. Integrated sensor 112 and circuitry 114 as part of transceiver 110 enable device 100 to generate a cryptographic key directly within transceiver 110, without requiring a separate sensor or transducer external to transceiver 110 and requiring CPU 120 to generate the key. Thus, no additional components are required within device 100 to facilitate the generation of cryptographic keys and the transmission of encrypted data. Further, transceiver 110 is capable of independently encrypting data without requiring prior configuration.

Figure 2:
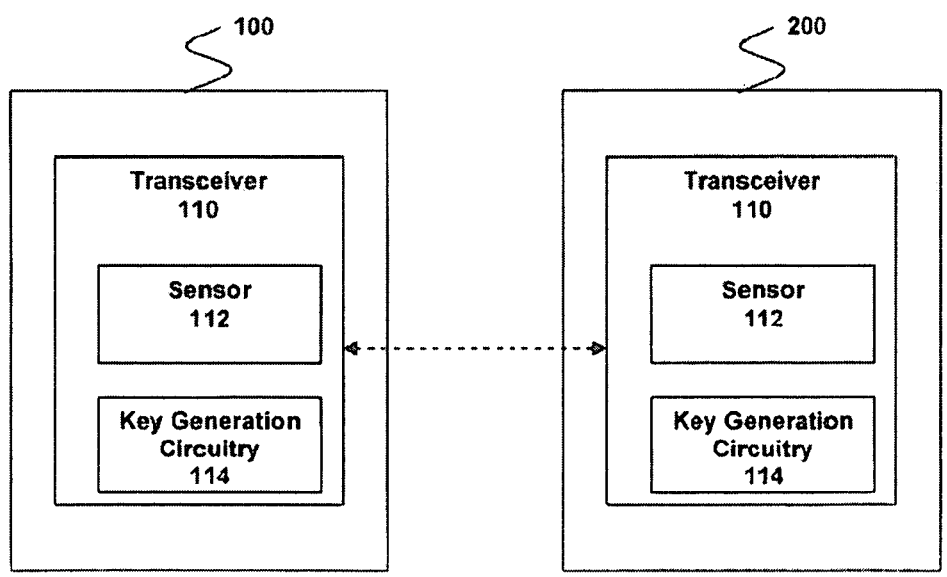
FIG. 2 is a block diagram of a plurality of devices according to an embodiment of the invention.

A plurality of devices 100 and 200 are depicted in FIG. 2. Devices 100 and 200, via transceivers 110, are adapted to generate identical symmetrical cryptographic keys. The generated identical symmetrical cryptographic keys can then be used for the exchange of encoded data between devices 100 and 200. In one embodiment, each device 100 and 200 comprises a transceiver 110 as described above with reference to FIG. 1. Sensors 112 comprise three-dimensional accelerations sensors in the example embodiment to be described, although alternate sensors as previously described can be used in one or both of devices 100 and 200.

To generate identical symmetrical cryptographic keys, devices 100 and 200 are together subjected to a physical or environmental stimulus. For example, devices 100 and 200 comprising acceleration sensors can be held or placed together by a user and shaken or moved by hand, subjected to vibration generated by hand or by a machine, or otherwise subjected to a common external physical stimulus. In one embodiment, devices 100 and 200 comprise coupling means (not shown) for selectively and removably securing devices 100 and 200 together to further facilitate common physical input. Coupling means can comprise, for example, one or more clips, bands, snaps, male and female couplers, magnets, slidably engageable couplers, interlocking couplers, friction couplers, and other similar devices.

Each sensor 112 independently generates an acceleration profile from the common stimulus. In one embodiment, an acceleration profile comprises a sequence of about 1,000 acceleration data points. In other embodiments, acceleration profiles can comprise a range of about 200 acceleration data points to about 100,000 data points. Experimental results in one embodiment showed an average match of the acceleration profile of device 100 and the acceleration profile of device 200 to be about 95%.

Each acceleration profile is stored within transceiver 110 in each of devices 100 and 200 in one embodiment. Device 100 and device 200 can then accurately but independently generate identical symmetrical keys from the acceleration profiles because each device 100 and 200, within transceiver 110, uses the same algorithm for cryptographic key generation. This cryptographic key generation algorithm is described in more detail below.

Figure 3:
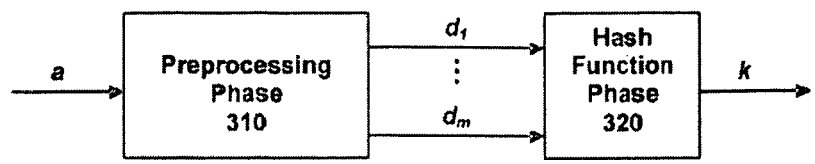
FIG. 3 is a block diagram of processing phases according to an embodiment of the invention.

First, an assumption can be made that each acceleration profile has a common starting time. Referring to FIG. 3, generation of the key can then be divided into two phases, a preprocessing phase 310 and a hash function phase 320.

During preprocessing phase 310 in one embodiment, the acceleration profile a is divided into a sequence of individual segments $a_i$, whereby i=1 . . . 25 and represents the i-th segment of acceleration sequence a. Each individual segment $a_i$ comprises forty acceleration data points in one embodiment, such that the entire acceleration profile a does not have to be processed at once. Generally, each $a_i$ is mapped to one key fragment $k_i$ and thus the symmetric cryptographic key $k=(k_1, \ldots, k_{25})$ is obtained by concatenating all of the $k_i$ together.

Figure 4:
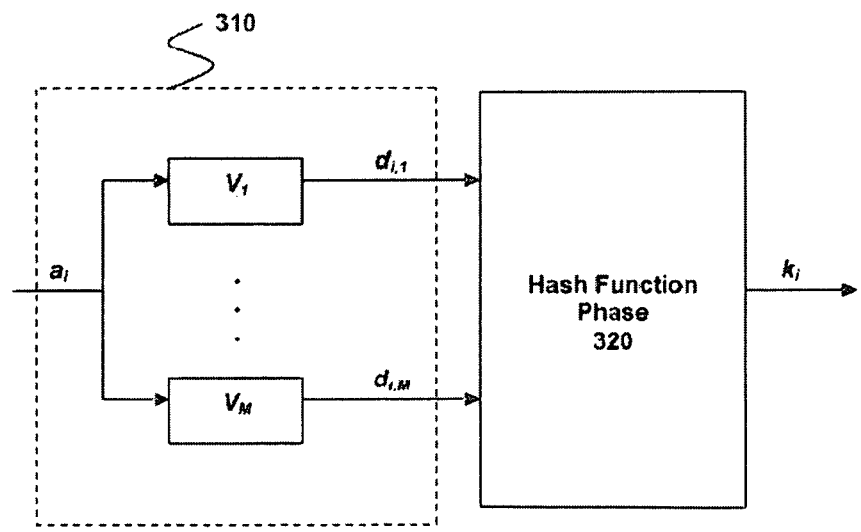
FIG. 4 is another block diagram of processing phases according to an embodiment of the invention.

The complexity of each segment $a_i$ can be reduced by comparing the segments $a_i$ with samples v, as depicted in FIG. 4. An objective here is to focus the main attributes of all segments $a_i$ to the key generation algorithm, to remove outlier components of the acceleration data, and to reduce memory resources for the implementation of the key generation algorithm. The samples v can be computed from a separate training set of acceleration data recorded while shaking devices 100 and 200 together or from an acceleration profile a stored in transceiver 110. Samples $v_m$ can now be regarded as either constant for all transceivers 110 when computed from the separate training set or variable when computed from the stored acceleration profile a, which means that the samples $v_m$ are computed again for each acceleration profile a. The samples are the Eigenvectors of the recorded acceleration data and represent the main components of which the segments $a_i$ consist.

Figure 5:
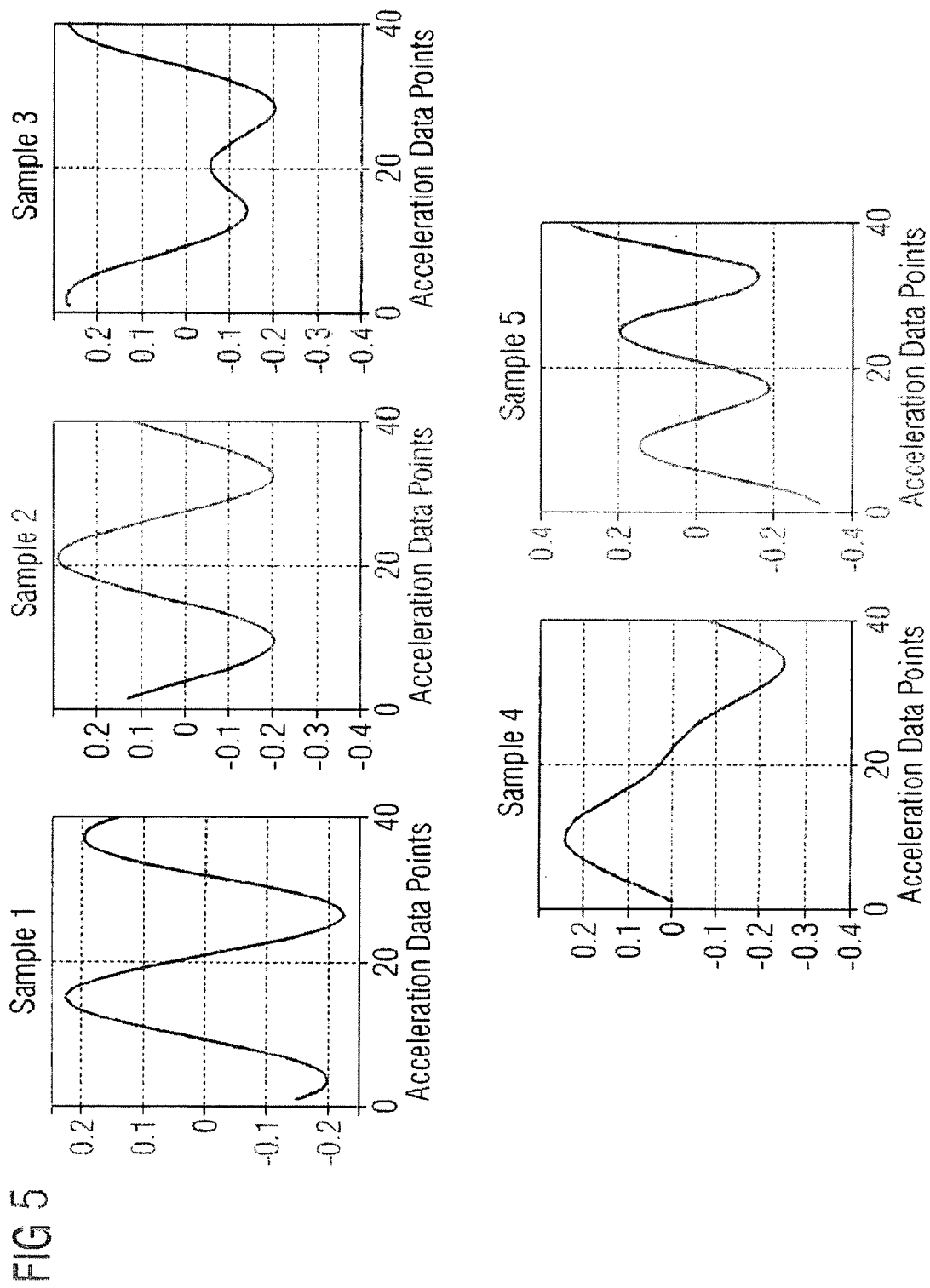
FIG. 5 depicts acceleration data point samples according to an embodiment of the invention.

Comparing segments $a_i$ with the samples $v_m$, where m=1 ... M, can produce M weight factors d for each segment $a_i$. The weight factors d provide an indication of the similarity between the respective segment $a_i$ and samples $v_m$. FIG. 5 depicts different samples $v_m$, where M=5. The higher the number of samples used for comparison, the more precise the segments can be represented. As the number of samples increases, however, so too do the required memory resources for the implementation of the key generation algorithm. Experimental results in one embodiment have shown that five samples are sufficient to represent the segments $a_i$ to more than 95% of the signal energy, although other numbers of samples can be used in other embodiments.

Figure 6:
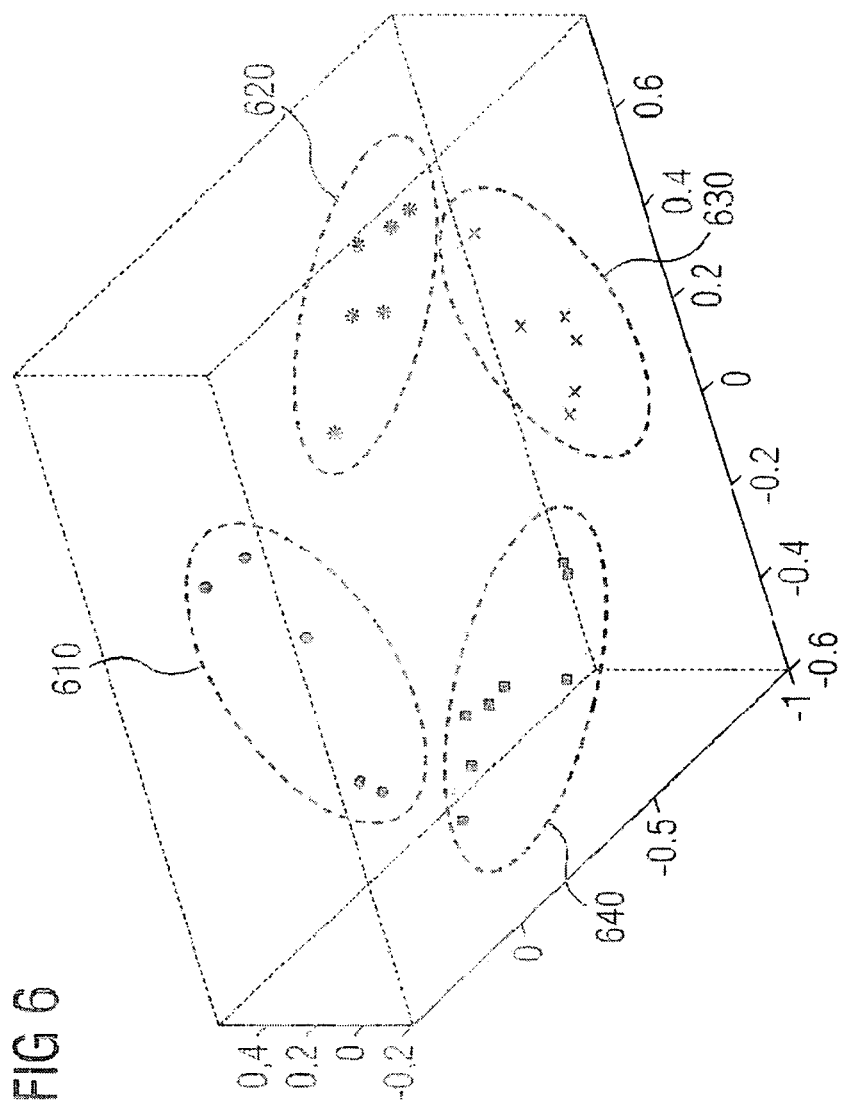
FIG. 6 depicts groups and symbols according to an embodiment of the invention.

A corresponding number of weight factors $d_m$ are then provided to the hash function phase. Referring again to FIGS. 3 and 4, five weight factors $d_m$ are provided to hash function 320 in an embodiment in which M=5. This reduces the calculation complexity by a factor of about eight. The objective of hash function 320 is to map similar weight factors $d_i$ to the same key fragment $k_i$. To this end, similar weight factors $d_i$ of acceleration profile a are then combined into a fixed number of groups. Four groups 610, 620, 630, 640 are shown in the embodiment of FIG. 6, although more or fewer groups can be used in other embodiments. For example, the number of groups can range from about two to about fifteen or more in other embodiments. Each group 610-640 can be assigned a number, for example 1 to 4. Then, the number of the group 610-640 in which the weight factor d.sub.i is combined is assigned to the key fragment $k_i$. A symmetrical cryptographic key k can then be created by concatenating the key fragments $k_i$ to the key $k=(k_1, \ldots, k_{25})$, while maintaining the original order of $d_i$. Experimental results in one embodiment generated identical 13-bit symmetrical keys independently in two devices 100 and 200 in 80% of cases, although other results may occur in other embodiments.

Figure 7:
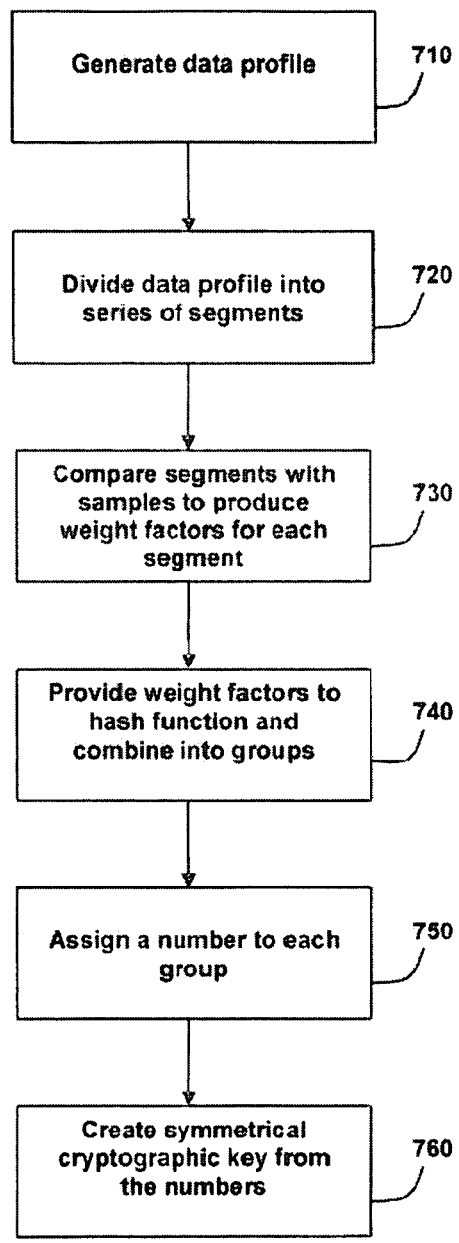
FIG. 7 is a flowchart according to an embodiment of the invention.

Thus, one embodiment of the algorithm implemented by each device 100 and 200 begins with generating a data profile at step 710 in FIG. 7. The data profile, as described in more detail above, can comprise an acceleration profile, an acoustic profile, or some other suitable data profile. At step 720, the data profile is divided into a series of segments. The segments are compared with samples to produce weight factors for each segment at step 730. The weight factors are provided to the hash function and combined into groups at step 740, and a number is assigned to each group at step 750. A symmetrical cryptographic key can be generated from the numbers at 760.

In one embodiment, transceiver 110, comprising integrated sensor 112 and key generation circuitry 114, is adapted to implement steps 710-760.

Devices 100 and 200 each comprising a transceiver 110 can vary according to embodiments of the invention. For example, device 100 can comprise a mobile phone, PDA, or other handheld communication device, and device 200 a wireless headset, headphones, microphone, data storage device, or other accessory configured for use with device 100. In another embodiment, device 100 can comprise a credit, debit, bank, or other financial or data card, and device 200 can comprise a key or other access device, such as a car key, office key, home key, keyless remote or other entry system, key fob, or another similar device. Various combinations of any of the aforementioned devices are also possible in other embodiments.

The relatively small, easy-to-handle size of the example devices mentioned facilitates simultaneous shaking or movement of devices 100 and 200 to generate identical symmetrical cryptographic keys. As previously described, devices 100 and 200 can also comprise coupling means to further aid in the generation of substantially similar acceleration profiles in each of devices 100 and 200. The devices themselves can also be amenable to implementing embodiments of the invention, given their size, portability, store of potentially vulnerable data and information, and common use, as well as the impracticality of implementing other, more complex encryption and security techniques.

In other embodiments, devices 100 and 200 and other similar optional devices comprise devices within a vehicle, aircraft, or other mobile structure. Securing some or all of these communications through encryption as described herein can increase the safety and security of the vehicle or aircraft, such as by preventing tampering with communications related to vehicle safety systems and eavesdropping on personal wireless communications within or surrounding the vehicle. Devices in vehicles for which encrypted communications may be desirable can include communication devices, such as a vehicle-mounted BLUETOOTH or other personal wireless communication devices; safety devices, such as tire pressure monitoring system components, airbag and passenger restraint system components, anti-lock braking and vehicle stability system components, and other components and systems; entertainment devices and systems; aeronautical communication and operating equipment; a central processor and/or transceiver device which exchanges and manages communications with other vehicle systems and devices, and other automotive, aeronautic, vehicular, and related systems and components.

Accordingly, in one embodiment, each device for which encrypted communication is desired in a vehicle, aircraft, or other structure comprises an integrated transceiver and sensor, as described above. In an acceleration sensor embodiment, each sensor can independently generate an acceleration profile from movement of the vehicle. The movement can be, for example, acceleration of the vehicle, general movement, and/or deceleration. In another embodiment in which the sensor comprises a microphone or acoustic sensor, each individual sensor can independently generate a data profile from, for example, the sound of the engine, ambient noise, or other sound related to the operation or use of the vehicle. Other types of data profiles can be generated in embodiments with other sensor types. Identical symmetrical cryptographic keys can then be generated independently by each device as previously described herein.

In other embodiments, such as those in which integrated sensors 112 in devices 100 and 200 comprise acoustic, infrared, ultrasonic, or other compatible sensors, devices 100 and 200 can comprise any of the aforementioned devices, as well as computers, laptops, appliances, telephones, cameras, and other devices. Devices 100 and 200, as well as additional devices, can be part of a home or office automation system, a personal area network (PAN), or other configuration of devices and systems which communicate with one another and for which identical symmetrical or system-wide cryptographic key generation is needed or desired.

Thus, the present invention includes integrated data transceivers and sensors. The sensor is adapted to generate a data profile, such as an acceleration profile in an embodiment in which the sensor comprises an acceleration sensor, from which the transceiver is capable of generating a symmetrical cryptographic key from an acceleration profile generated by the sensor. The integrated data transceiver and sensor can comprise a single integrated circuit, reducing the overall complexity and cost of a device which includes the integrated data transceiver and sensor.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A method for exchanging cryptographically encoded data comprising:
   obtaining a data profile by a sensing element integrated with a transceiver in each of a plurality of devices;
   calculating an identical symmetrical cryptographic key from the data profile by the transceiver in each of the plurality of devices by
      dividing the data profile into a plurality of sements,
      determining a plurality of weight factors, one for each of the plurality of segments, by comparing the plurality of segments with at least one sample,
      providing the plurality of weight factors to a hash function,
      combining the plurality of weight factors into a plurality of groups,
      assigning a number to each of the plurality of groups, and
      creating the identical symmetrical cryptographic key from the number assigned to each of the plurality of groups; and
   using the identical symmetrical cryptographic key to encrypt and decrypt data in the transceiver in each of the plurality of devices, in communications among the plurality of devices.

2. The method of claim 1, wherein obtaining a data profile comprises:
   applying a common physical stimulus to the plurality of devices; and
   creating a data profile by the sensing element in each of the plurality of devices based at least in part on the common physical stimulus.

3. The method of claim 2, further comprising removably coupling the plurality of devices.

4. The method of claim 2, wherein applying a common physical stimulus further comprises shaking the plurality of devices, and wherein creating a data profile further comprises creating a three-dimensional acceleration profile.

5. The method of claim 2, wherein applying a common physical stimulus further comprises operating a vehicle to which the plurality of devices is related.

6. The method of claim 5, wherein creating a data profile further comprises creating an acceleration profile.

7. The method of claim 2, wherein creating a data profile further comprises creating an acoustic profite.

8. An algorithm encrypting and decrypting data communications, the algorithm executed within a transceiver and comprising:
   creating, by a sensor integrated with the transceiver, a data profile front a physical input;
   segmenting the data profile into a plurality of segments;
   determining a plurality of weight factors, one for each of the plurality of segments, by comparing the plurality of segments with at least one sample;
   providing the plurality of weight factors to a hash function executed within the transceiver;
   combining the plurality or weight factors into a plurality of groups;
   assigning a number to each of the plurality of groups;
   creating a cryptographic key from the number assigned to each of the plurality of groups; and
   encrypting data by the transceiver using the cryptographic key.

9. The algorithm of claim 8, further comprising decrypting data by the transceiver using the cryptographic key, wherein the data decrypted has been encrypted and transmitted by a second transceiver having an identical cryptographic key created according, to the algorithm.

* * * * *